US009524562B2

(12) United States Patent
Liang et al.

(10) Patent No.: US 9,524,562 B2
(45) Date of Patent: Dec. 20, 2016

(54) OBJECT TRACKING METHOD AND DEVICE

(71) Applicants: Lingyan Liang, Beijing (CN); Gang Wang, Beijing (CN)

(72) Inventors: Lingyan Liang, Beijing (CN); Gang Wang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 121 days.

(21) Appl. No.: 14/600,402

(22) Filed: Jan. 20, 2015

(65) Prior Publication Data
US 2015/0206004 A1 Jul. 23, 2015

(30) Foreign Application Priority Data
Jan. 20, 2014 (CN) .......................... 2014 1 0025887

(51) Int. Cl.
*G06K 9/00* (2006.01)
*G06T 7/20* (2006.01)
*G06K 9/62* (2006.01)

(52) U.S. Cl.
CPC .............. *G06T 7/204* (2013.01); *G06K 9/6212* (2013.01); *G06T 7/208* (2013.01); *G06K 9/00355* (2013.01); *G06T 2207/10024* (2013.01); *G06T 2207/10028* (2013.01); *G06T 2207/30196* (2013.01)

(58) Field of Classification Search
CPC ............ G06T 2207/10028; G06T 2207/30196; G06T 7/204; G06K 9/00389; G06K 9/4604; G06K 9/6215
USPC ........................................................ 382/103
See application file for complete search history.

(56) References Cited

U.S. PATENT DOCUMENTS

| 8,254,643 B2 | 8/2012 | Shi et al. |
| 8,363,909 B2 | 1/2013 | Guan et al. |
| 8,660,317 B2 | 2/2014 | Li et al. |
| 9,224,060 B1 * | 12/2015 | Ramaswamy ..... G06K 9/00912 |
| 2009/0016732 A1 | 1/2009 | Ueno et al. |

(Continued)

OTHER PUBLICATIONS

Qiao Bing et al. "Object Tracking Algorithm Based on CamShift with Dual ROI and Velocity Information Fusion" Information and Control, vol. 40, No. 3, Jun. 2011.

(Continued)

*Primary Examiner* — Wesley Tucker
(74) *Attorney, Agent, or Firm* — Harness, Dickey & Pierce, PLC

(57) ABSTRACT

Disclosed is an object tracking method comprising steps of obtaining a grayscale image sequence and a depth image sequence; predicting a candidate target region of a tracking object in a current image; determining a depth weight image of the candidate target region; acquiring a target template which is expressed by a probability density distribution of features; expressing, by a probability density distribution of features, a candidate target whose position moves in the candidate target region; calculating, based on a probability density expression of the target template and a probability density expression of the candidate target, a similarity between the target template and the candidate target, so as to get a confidence level image of the candidate target region; and locating, based on the confidence level image of the candidate target region, a position of the tracking object in the current image.

18 Claims, 6 Drawing Sheets

(56) References Cited

U.S. PATENT DOCUMENTS

| | | |
|---|---|---|
| 2009/0262981 A1* | 10/2009 | Ike ................... G06K 9/3233 |
| | | 382/103 |
| 2011/0211754 A1 | 9/2011 | Litvak et al. |
| 2011/0221890 A1* | 9/2011 | Yamashita .............. G06T 7/204 |
| | | 348/135 |
| 2011/0228987 A1 | 9/2011 | Iwasaki et al. |
| 2011/0298898 A1 | 12/2011 | Jung et al. |
| 2012/0242794 A1 | 9/2012 | Park et al. |
| 2012/0306876 A1* | 12/2012 | Shotton ................... G06T 17/10 |
| | | 345/424 |
| 2013/0002814 A1 | 1/2013 | Park et al. |
| 2013/0033713 A1 | 2/2013 | Patana et al. |
| 2013/0346168 A1* | 12/2013 | Zhou ....................... G06F 1/163 |
| | | 705/14.4 |
| 2015/0055828 A1 | 2/2015 | Zhao et al. |
| 2015/0055829 A1 | 2/2015 | Liang |
| 2015/0124059 A1 | 5/2015 | Georgiev et al. |

OTHER PUBLICATIONS

Comaniciu et al. "Kernel-based Object Tracking" Pattern Analysis and Machine Intelligence, IEEE Transactions on Pattern Analysis and Machine Intelligence, vol. 25, No. 5, pp. 564-577, May 2003.

U.S. Office Action dated Mar. 23, 2016, issued in U.S. Appl. No. 14/697,804.

U.S. Office Action dated Apr. 8, 2016, issued in U.S. Appl. No. 14/629,650.

Office Action dated Sep. 8, 2016 issued in related U.S. Appl. No. 14/629,650.

\* cited by examiner

OBJECT TRACKING METHOD AND DEVICE

BACKGROUND OF THE INVENTION

1. Field of the Invention

The present invention relates to the field of image processing, and particularly relates to an object tracking method and device on the basis of computer vision.

2. Description of the Related Art

At present, in the field of computer vision, object tracking is playing an important role. For example, the object tracking such as hand gesture tracking, pedestrian tracking, or vehicle tracking has been involved in a human-machine interactive system, a user monitoring system, a drive assistance system, etc.

In a case where the hand gesture tracking is taken as an example, a hand gesture control system is very convenient to users. An effective hand gesture recognition system may provide a smooth and available interactive way, and in this kind of hand gesture recognition system, hand tracking is a very important process.

In general, for the sake of user's operations, a hand tracking system should not require a user to wear any special device such as a special glove or a colorful dress. In addition, a hand is a kind of non-rigid object, and has characteristics such as fast motion, easy deformation, and self-shielding. As a result, a hand tracking technique is very challenging.

Currently the hand tracking technique mainly adopts color features to conduct tracking. As is known to all, color information is very sensitive to lighting conditions and background colors. As a result, the robustness of a tracking system adopting color features to conduct tracking is not good. In addition, a tracking system is also easily influenced by partial shielding or the change of the form of a tracking object, so that the tracking performance may be decreased. In order to increase the robustness of a tracking system, up to now, many studies have been conducted.

For example, in U.S. Patent Application Publication No. 2011/0211754 A1, an object tracking method for image processing is disclosed. The method includes receiving a depth image of a scene containing a human subject and receiving a color image of the scene containing the human subject. A part of a body of the subject is identified in at least one of the images. A quality of both the depth image and the color image is evaluated, and responsively to the quality, one of the images is selected to be dominant in processing of the part of the body in the images. The identified part is localized in the dominant one of the images, while using supporting data from the other one of the images. However, in this technique, the tracking result is still influenced by lighting conditions. As a result, in a case where there is a bad lighting condition, the tracking result mainly relies on tracking conducted on the basis of the depth image. In addition, since the tracking result obtained on the basis of the depth image mainly depends on a determination according to a predetermined threshold, the robustness may not be good.

Furthermore, in a paper entitled "Object Tracking Algorithm Based on CamShift with Dual ROI and Velocity Information Fusion" whose authors are QIAO Bing, L I Zhicheng, and H U Peng and which is published on "Information and Control", in order to deal with the tracking divergence and the recapturing failure after occlusion of the continuously adaptive mean Shift algorithm (CamShift) to track objects passing the background with similar colors to them, an improved CamShift algorithm with dual region of interest (ROI) and velocity information fusion is proposed to track moving objects. The main idea of this algorithm is to divide the single ROI, which is used to specify the region to be tracked in CamShift, into two sub ROIs, of which one is the primary tracking region and the other one is the auxiliary tacking region. For each of these two sub ROIs, a CamShift tracker is designed respectively. Through the coordination of these two CamShift trackers in the process of tracking, the tracking robustness of this algorithm is enhanced and the interference problem due to similar color in the CamShift is solved. In this technique, however, in a case where the color of a tracking object is very similar to the background color, the tracking result may not be correct.

SUMMARY OF THE INVENTION

According to a first aspect of the present invention, an object tracking method is provided. The object tracking method includes:

an obtention step of obtaining a grayscale image sequence and its corresponding depth image sequence;

a prediction step of predicting a candidate target region of a tracking object in at least one of a current grayscale image and it corresponding depth image;

a determination step of determining a depth weight image of the candidate target region, wherein, the depth weight image includes depth weight information of each pixel, and the depth weight information of each pixel refers to depth information based on this pixel and a probability of this pixel belonging to the tracking object;

an acquirement step of acquiring a target template, wherein, the target template is expressed by a probability density distribution of features;

an expression step of expressing, by a probability density distribution of features, a candidate target whose position moves in the candidate target region, wherein, in a process of estimating probability densities of features of the candidate target, each pixel is weighted based on both color space information and the depth weight information of this pixel;

a calculation step of calculating, based on a probability density expression of the target template and a probability density expression of the candidate target, a similarity between the target template and the candidate target, so as to get a confidence level image of the candidate target region; and a location step of locating, based on the confidence level image of the candidate target region, a position of the tracking object in the corresponding current image.

According to a second aspect of the present invention, an object tracking device is provided. The object tracking device includes:

an obtention part configured to obtain a grayscale image sequence and its corresponding depth image sequence;

a prediction part configured to predict a candidate target region of a tracking object in at least one of a current grayscale image and it corresponding depth image;

a determination part configured to determine a depth weight image of the candidate target region, wherein, the depth weight image includes depth weight information of each pixel, and the depth weight information of each pixel refers to depth information based on this pixel and a probability of this pixel belonging to the tracking object;

an acquirement part configured to acquire a target template, wherein, the target template is expressed by a probability density distribution of features;

an expression part configured to express, by a probability density distribution of features, a candidate target whose position moves in the candidate target region, wherein, in a process of estimating probability densities of features of the candidate target, each pixel is weighted based on both color space information and the depth weight information of this pixel;

a calculation part configured to calculate, based on a probability density expression of the target template and a probability density expression of the candidate target, a similarity between the target template and the candidate target, so as to get a confidence level image of the candidate target region; and a location part configured to locate, based on the confidence level image of the candidate target region, a position of the tracking object in the corresponding current image.

By utilizing the object tracking method and the object tracking device, in a process of estimating the probability densities of various features of a candidate target, for each pixel, it is possible to let this pixel be weighted on the basis of both the color space information of this pixel and the depth weight information of this pixel. As a result, compared to a conventional technique in which the depth information is independently considered or serves as a kind of threshold when conducting filtering of a candidate target, it is possible to let the depth information be naturally and closely combined into the whole object tracking process, so as to increase the rate of utilization of information and to improve the accuracy of tracking.

DETAILED DESCRIPTION OF THE PREFERRED EMBODIMENTS

In order to let those people skilled in the art better understand the present invention, hereinafter the present invention will be concretely described on the basis of the drawings and various embodiments in an order as follows.

1. Example of Application Scenario
2. Example of Configuration of Object Tracking Device
3. First Embodiment of Object Tracking Method
4. Second Embodiment of Object Tracking Method
5. Third Embodiment of Object Tracking Method
6. Example Computer System for Object Tracking Here it should be noted that in the following description, a human hand (also called a "hand") is taken as an example of a tracking object. However, this is just an example; actually, the present invention may be utilized for tracking any object. That is to say, the tracking object may be a human face, the whole human body, a movable object, etc.

1. Example of Application Scenario

Figure 1:
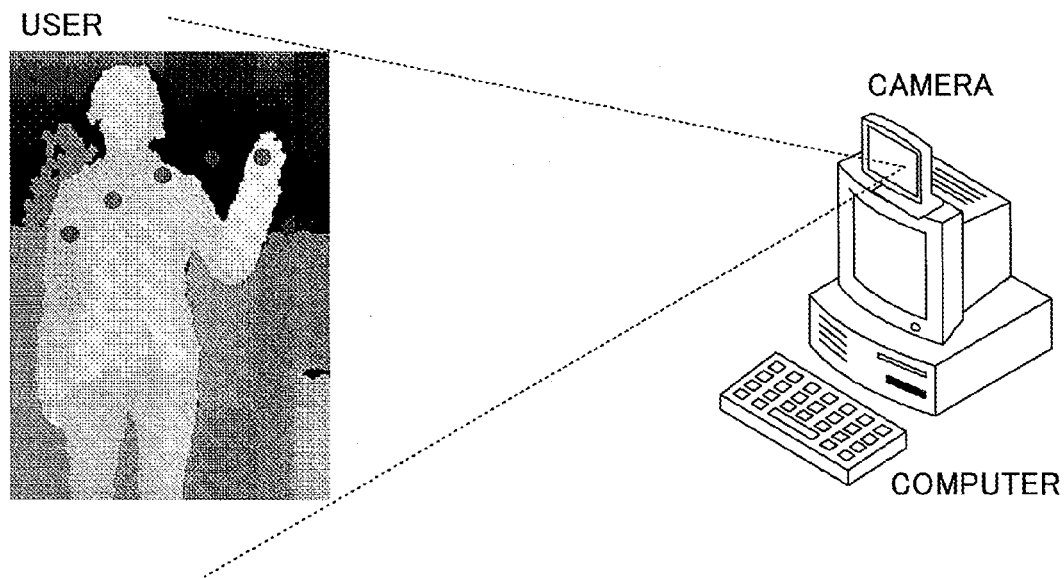
FIG. 1 illustrates a scenario of human-machine interaction in which a hand tracking technique according to an embodiment of the present invention is applied.

FIG. 1 illustrates a scenario of human-machine interaction in which a hand tracking technique according to an embodiment of the present invention is applied.

As shown in FIG. 1, a camera is set on the top of a computer, and a user stands in the camera based range. When the user moves his/her hand in the camera based range, the computer may calculate the real positional information of the hand, so as to achieve the purpose of tracking the hand in real time. In addition, the black points in this drawing refer to the positions of the hand at different time points.

Preferably, the camera may capture color images and depth images; for example, it may be a two-lens camera. As the people skilled in the art know, a depth image refers to an image whose pixel values are depth values. Compared to a grayscale image, the depth image includes depth (distance) information; as a result, it is specially suitable to be applied to various applications needing stereoscopic (three dimensional) information. In addition, as is known to all, there is a simple conversion relationship between the depth and disparity vales of a pixel. As a result, the meaning of the depth information in the present invention is wide, including disparity information.

Here it should be noted that what FIG. 1 shows is just an example. That is to say, a hand tracking device is not limited to a computer, but may be a game machine, a projector, a television, and so on.

2. Example of Configuration of Object Tracking Device

In what follows, an example of a configuration of an object tracking device according to an embodiment of the present invention will be given by referring to FIG. 2.

Figure 2:
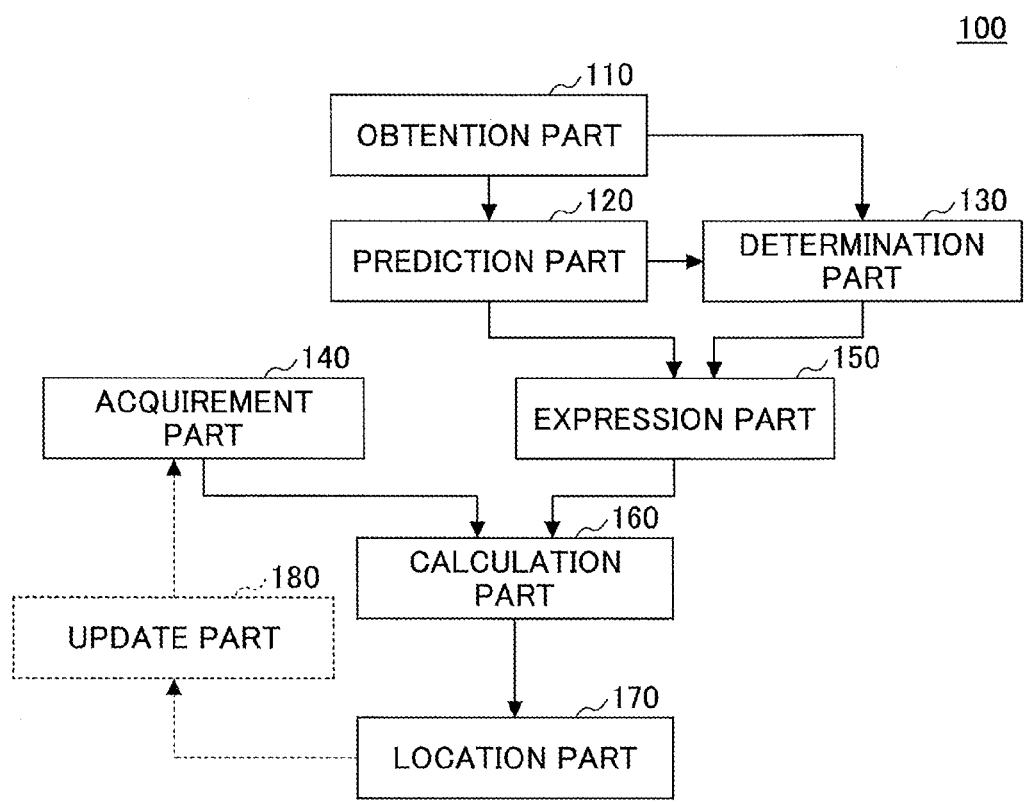
FIG. 2 illustrates a configurational block diagram of an object tracking device 100 according to an embodiment of the present invention.

FIG. 2 illustrates a configurational block diagram of an objecting tracking device 100 according to an embodiment of the present invention.

As shown in FIG. 2, the object tracking device 100 includes an image obtention part (also called an "obtention part") 110, a candidate target region prediction part (also called a "prediction part") 120, a depth weight image determination part (also called a "determination part") 130, a target template acquirement part (also called an "acquirement part") 140, a candidate target expression part (also called an "expression part") 150, a confidence level image obtention part (also called a "calculation part") 160, and a tracking object location part (also called a "location part") 170.

The obtention part 110 is configured to obtain a grayscale image sequence and its corresponding depth image sequence; for example, it may be configured to receive color images and their corresponding depth images from a two-lens camera.

The prediction part 120 is configured to predict a candidate target region of a tracking object in at least one of a current grayscale image and its corresponding depth image.

The determination part 130 is configured to determine a depth weight image of the candidate target region. The depth weight image includes the depth weight information of each pixel, and the depth weight information of each pixel refers to the depth information base on this pixel and the probability of this pixel belonging to the tracking object.

The acquirement part 140 is configured to acquire a target template which is expressed by the probability densities of features.

The expression part 150 is configured to express, by utilizing the probability densities of features, a candidate target whose position moves in the candidate target region. In the process of estimating the probability densities of features of the candidate target, each pixel is weighed on the basis of both the color space information of this pixel and the depth weight information of this pixel.

The calculation part 160 is configured to calculate, on the basis of the probability density expressions of the target template and the candidate target, the similarity between the target template and the candidate target, so as to get a confidence level image of the candidate target region.

The location part 170 is configured to locate, on the basis of the confidence level image, the position of the tracking object in the corresponding current image.

Optionally, the object tracking device 100 may further include a target template update part (also called an "update part") 180 configured to evaluate the tracking result of the location part 170, and to carry out target template update at the right time.

Here it should be noted that an arrow shown in FIG. 2 only means that the functions of the related two parts connected by the arrow have a logical relationship; that is to say, the related two parts may be directly or indirectly connected for achieving their functions. Additionally, although two parts in FIG. 2 are not connected by an arrow, that does not mean the two parts do not have a logical relationship. For example, the location part 170 and the update part 180 may have a logical relationship with the obtention part 110; that is to say, the location part 170 and the update part 180 may need to utilize the obtention part 110 to input one or more images.

Moreover, the present invention is not limited to the structure of each part of the object tracking device 100 as well as the number of the parts of the object tracking device 100. Two or more parts of the object tracking device 100 may be combined as one independent part to implement or achieve the corresponding functions. Each part of the object tracking device 100 may also be divided into plural sub parts to implement or achieve the corresponding function. And one or more other parts such as a display part (for example, configured to display the result obtained by the location part 170) and a communications part (for example, configured to send the related information and/or intermediate results to an external device) may further be included in the object tracking device 100.

3. First Embodiment of Object Tracking Method

Figure 3:
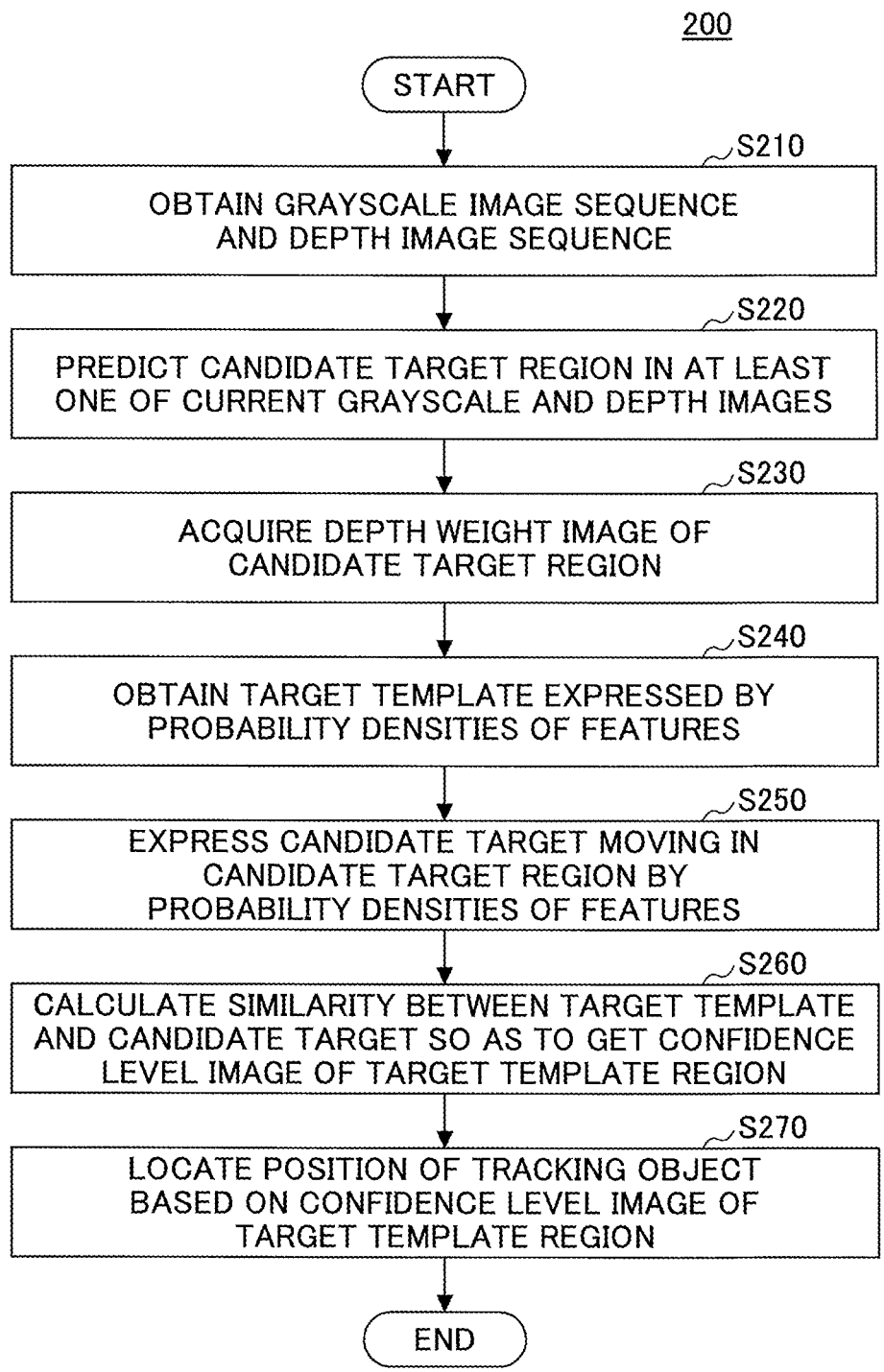
FIG. 3 is a flowchart of an object tracking method 200 according to an embodiment of the present invention.

FIG. 3 is a flowchart of an object tracking method 200 according to an embodiment of the present invention.

As shown in FIG. 3, in STEP S210, the obtention part 110 obtains a grayscale image sequence and the related depth image sequence.

For example, it is possible to use a two-lens camera, a multi-lens camera, or a stereo camera to capture images, and then, to input the images into the obtention part 110. The images input into the obtention part 110 may be only RGB color images. In this case, the obtention part 100 may obtain the related depth images on the basis of the RGB images (for example, right and left images). Alternatively, it is possible to input both RGB color images and the related depth images into the obtention part 100.

Optionally, the obtention part 110 may also remotely receive the above-mentioned images via a wired or wireless network.

In addition, although a two-lens camera is taken as an example of a stereo camera in this specification, other types of stereo cameras may also be applied to the present invention. For example, it is possible to use a stereo camera, which may emit infrared rays to generate stereo information, such as the Kinect by Microsoft, one based on the TOF (Time of Flight) technique, or one based on the structured light.

In STEP S220, the prediction part 120 predicts a candidate target region of a tracking object in at least one of a current grayscale image and the related depth image (i.e., the current depth image).

By predicting the candidate target region of the tracking object, in the follow-on processes, the tracking object will be sought only in the candidate target region. In this way, it is possible to reduce the amount of processing, to improve the real time of tracking, and to increase the robustness of the corresponding system.

In an example, it is possible to predict, on the basis of the prior motion information of the tracking object such as the speed and accelerated speed of movement, the candidate target region of the tracking object in the current image (frame).

In particular, for instance, the motion of a hand in a local range approaches uniform motion. If the prediction is conducted on the basis of the speed of movement, then in the current image, the probable occurrence position of the hand may be calculated according to the following equations (1) and (2). At present, well-used motion prediction methods are the Kalman Filter, the Particle Filter, etc. Any one of them may be adopted in this embodiment.

$$\begin{cases} S_{x,t} = S_{x,t-1} + V_{x,t-1} * \Delta t \\ S_{y,t} = S_{y,t-1} + V_{y,t-1} * \Delta t \end{cases} \quad (1)$$

$$\begin{cases} V_{x,t-1} = \frac{(S_{x,t-1} - S_{x,t-2})}{\Delta t} \\ V_{y,t-1} = \frac{(S_{y,t-1} - S_{y,t-2})}{\Delta t} \end{cases} \quad (2)$$

Here in the equation (1), $(S_{x,t-1}, S_{y,t-1})$ refers to the horizontal and vertical coordinates of the hand position in the immediately prior frame (i.e., at the time point t−1); $(S_{x,t}, S_{y,t})$ refers to the horizontal and vertical coordinates of the probable hand position in the current frame (i.e., at the time point t); and $\Delta t$ refers to the time interval between the two frames. The equation (2) shows how to calculate the speed of movement.

In an example, the hand position prediction also includes depth (or distance) prediction. In this case, on the basis of the equations (1) and (2), it is possible to obtain the following equations (3) and (4).

$$\begin{cases} S_{x,t} = S_{x,t-1} + V_{x,t-1} * \Delta t \\ S_{y,t} = S_{y,t-1} + V_{y,t-1} * \Delta t \\ S_{z,t} = S_{z,t-1} + V_{z,t-1} * \Delta t \end{cases} \quad (3)$$

$$\begin{cases} V_{x,t-1} = \frac{S_{x,t-1} - S_{x,t-2}}{\Delta t} \\ V_{y,t-1} = \frac{S_{y,t-1} - S_{y,t-2}}{\Delta t} \\ V_{z,t-1} = \frac{S_{z,t-1} - S_{z,t-2}}{\Delta t} \end{cases} \quad (4)$$

By conducting the candidate target region prediction, it is possible not only to decrease the processing time but also to increase the robustness of the related system.

In STEP S230, the acquirement part 130 acquires the depth weight image of the candidate target region. The depth weight image includes the depth weight information of each pixel, and the depth weight information of each pixel refers to depth information based on this pixel and the probability of this pixel belonging to the tracking object.

The aim of this step is to estimate the probability of each pixel belonging to the tracking object.

In an example, the determination of the depth weight image of the candidate target region includes the following steps.

First a representative (typical) depth value $depth_{object}$ of the tracking object in the current frame is predicted.

After that, the probability of a pixel i in the candidate target region belonging to the tracking object is calculated according to the following equation (5).

$$v(i) = \frac{\min(depth_{object}, depth(i))}{\max(depth_{object}, depth(i))} \quad (5)$$

Here i refers to the index of a pixel in the candidate target region; depth(i) refers to the depth value of the pixel i or the smoothed depth value of a local range (a local area) including the pixel i; $\min(depth_{object}, depth(i))$ refers to the smaller one of $depth_{object}$ and depth (i); max $(depth_{object}, depth (i))$ refers to the larger one of $depth_{object}$ and depth(i). Here it should be noted that the reason of obtaining the smoothed depth value of a local range surrounding the pixel i is because in some cases, the depth value of the pixel i is influenced by noise. In these cases, it is possible to perform, on the basis of the depth values of the pixels located in a predetermined local range including the pixel i, a smoothing process on the depth value of the pixel i.

In an example, it is possible to adopt the following equation (6) to calculate the probability of a pixel i in the candidate target region, belonging to the tracking object.

$$v(i) = k\left( \left\| \frac{depth(i) - depth_{object}}{h^{depth}} \right\|^2 \right) \quad (6)$$

Here i refers to the index of a pixel in the candidate target region; depth(i) refers to the depth value of the pixel i or the smoothed depth value of a depth local range (a local area) including the pixel i; $h^{depth}$ refers to the width with respect to the central point $depth_{object}$; and $k(\cdot)$ refers to a kernel function such as the Gaussian function.

Here it should be noted that the representative depth value $depth_{object}$ of the tracking object in the current frame may be obtained by letting the averaged depth value of the tracking object in one or more prior frames serve as the representative depth value $depth_{object}$; letting the depth value, whose frequency of being selected is highest, of the tracking object in one or more prior frames serve as the representative depth value $depth_{object}$; letting the averaged depth value of the candidate target region of the current frame serve as the representative depth value $depth_{object}$; letting the depth value, whose frequency of being selected is highest, in the candidate target region of the current frame serve as the representative depth value $depth_{object}$; and so on.

For instance, it is possible to utilize the third sub equation in the equation (3) and the third sub equation in the equation (4) to obtain the speed of movement of the hand along the depth direction on the basis of the historical information, so as to estimate the depth value of the hand in the current frame to serve as the representative depth value $depth_{object}$.

Figure 4:
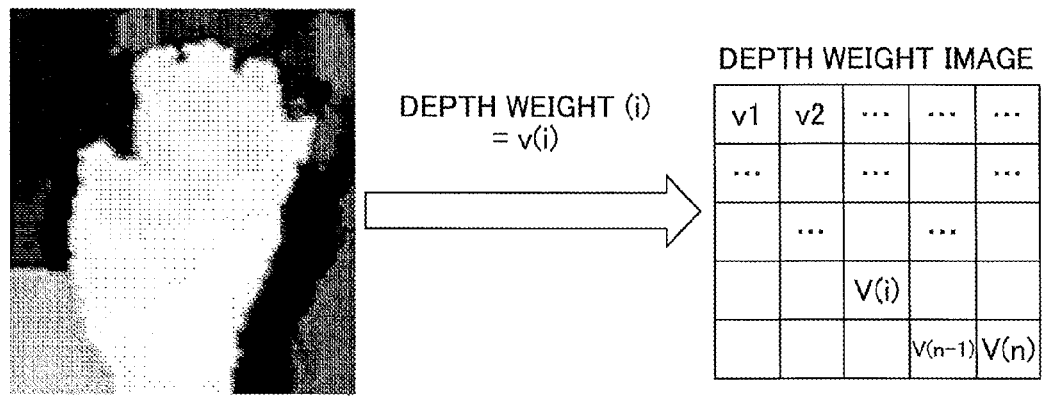
FIG. 4 illustrates an example of a depth weight image obtained by carrying out calculation with respect to a candidate target region.

FIG. 4 illustrates an example of a depth weight image obtained by carrying out calculation with respect to a candidate target region.

In STEP S240, the acquirement part 140 acquires a target template which is expressed by the probability density distribution of features.

Here it should be noted that the target template corresponds to a region (also called a "target region") including the tracking object in, for example, the first image in the grayscale image sequence or the corresponding depth image sequence. In other words, the target template may be acquired on the basis of the target region including the tracking object in the first image in any one of the two sequences. However, the present invention is not limited to this; that is to say, it is possible to use any prior image in any one of the two sequences, including the tracking object to acquire the target template of the tracking object. Moreover, in this case, since the tracking object has been detected and tracked in the prior images, it is also called a "tracked object".

Furthermore, regarding the target template, it may be expressed (described) by various forms.

For example, it is possible to utilize the RGB color features of each pixel in a target region of a grayscale image to directly express the target template.

In an example, the feature of a pixel refers to the RGB color feature components, or it may be said that the value range of a pixel is the RGB color space.

In order to express the target template by utilizing the probability density distribution of the respective features in a feature space, for instance, it is possible to perform discretization on the respective features so as to use the probability of feature values in the feature space to express the target template. Here it should be noted that the present invention is not limited to this. For example, in a case where the probability density distribution of continuous feature values in the feature space may be obtained, it is also possible to use this kind of probability density distribution to express the target template.

For example, regarding a 3-dimensional RGB feature space, it may be divided into m space columns (here it should be noted that a space column is also called a "bin"). For instance, if the value range of the R color feature is divided into a intervals, the value range of the G color feature is divided into b intervals, and the value range of the B color feature is divided into c intervals, then m (m=a*b*c) bins may be obtained, i.e., the number of feature values (or the number of bins) in the feature space is m. After that, it is possible to express the target template by obtaining (calculating) the number of pixels corresponding to the bins (or corresponding to the feature values in the feature space).

If it is assumed that a function $b(\cdot)$ is an interval quantization function which is used to associate a pixel, which is located at $x_i$ (a coordinate in a 2-dimensional space), with a space column bin in a quantified feature space, then in an instance, the target template may be expressed by the probability of each feature value $u=1, \ldots, m$ (i.e., each bin) in a feature space. This is called "target template expression" or "target template description", as shown by the following equation (7).

$$q_u = C_q \sum_{i=1}^{N} \left( \delta[b(x_i) - u] * k\left( \| \frac{x_i - x_0}{h} \|^2 \right) * v(i) \right) \quad (7)$$

Here $x_0$ refers to the central position of a target region (in general, its value is 0); u refers to the index of a feature value (u=1, . . . , m, and as described above, m refers to the total number of the feature values in the feature space); $q_u$ refers to the probability of the $u^{th}$ feature value in the feature space of the target template; N refers to the total number of pixels in the target region; i refers to the index of a pixel in the target region; $x_i$ refers to the 2-dimensional coordinate of the $i^{th}$ pixel (in general, refers to a normalized pixel position; as a result, the value of $x_0$ is 0); h refers to a width with respect to the central point (i.e., the central position), which indicates the size of the target region; $C_q$ refers to a normalization coefficient; b(·) refers to the interval quantization function, as described above; δ refers to the Kronecker delta function, wherein, if b($x_i$)=u, then δ=1, otherwise, δ=0; and v(i) refers to a depth weight value of the $i^{th}$ pixel.

The normalization coefficient $C_q$ may be calculated according to the following equation (8).

$$C_q = \frac{1}{\sum_{i=1}^{N} k\left( \| \frac{x_i - x_0}{h} \|^2 \right) * v(i)} \quad (8)$$

Here k(·) refers to a weight kernel function of a 2-dimensional space, whose purpose is to perform weighting on the pixels on the basis of the 2-dimensional information so as to reduce the influence due to shielding or shadows. In general, a pixel near the center of the target region is more reliable than other pixels; as a result, a weight value given by $$k\left( \| \frac{x_i - x_0}{h} \|^2 \right)$$

to a pixel near the center is larger, and that given to a pixel far from the center is smaller. In an instance, the kernel function is the Gaussian function.

For more information about the kernel based object tracking technique and template expression, it is possible to see a paper entitled "Kernel-based Object Tracking" published in 2003 on Pattern Analysis and Machine Intelligence, IEEE Transactions on (Volumn: 25, Issue: 5).

Here it should be noted that the present invention is not limited to the RGB color features for expressing the feature of each pixel in the target region including the tracked object, as described above. That is to say, it is also possible to add other feature(s) as needed, or to replace the RGB color features by other feature(s), for example, the shape feature, the outline feature, the area feature, etc.

In an example, the features for expressing each pixel in a target region including a tracked object may include the color feature component in grayscale information (i.e., a grayscale image), the gradient feature component in the grayscale information, and the gradient feature component in a depth image. In this example, it is possible to utilize the probability density distribution of these three kinds of feature components to express (acquire) the target template. Compared to the above example in which only the RGB color features are utilized to acquire the target template, in this example, the acquired target template has more information, and the gradient feature components may better reflect the outline feature of a hand, for example, a direction feature; as a result, it is possible to more efficiently reduce the influence due to noise, and to dramatically improve the tracking accuracy.

In an instance, regarding the case where the three kinds of feature components are utilized to acquire the target template, it is also possible to perform discretization on the respective feature as done in the above example in which the RGB color features are utilized to obtain a feature histogram, so as to utilize the probability of each feature value in the corresponding feature space to express (acquire) the target template. For example, if it is assumed that there is a L-dimensional feature space, and the value range of the corresponding feature i (i=1, . . . , L) in each dimension is divided into $n_i$ intervals so that the feature space is divided into m space columns (bins), then it is possible to obtain m (m=$n_1$*$n_2$* . . . *$n_i$* . . . *$n_L$) bins. After that, it is possible to express the target template by obtaining (calculating) the number of pixels corresponding to the bins (or corresponding to the feature values in the feature space) on the basis of, for example, the equation (7) above.

Here it should be noted that regarding the target region corresponding to the target template, it may be manually determined in, for example, the first frame in the grayscale image sequence or the depth image sequence, and it may be a rectangle or ellipse. In addition, after the target template is acquired, it may be stored in a predetermined storage.

The purpose of acquiring the target template is as follows. Namely, in the follow-on tracking processes, it is possible to let a window, whose size is the same as that of the target template, move in the candidate target region obtained in STEP S220 of FIG. 3, so as to obtain a candidate target. In this way, by carrying out the matching between the target template and the candidate target, it is possible to locate the tracking object.

Optionally, after successfully locating the tracking object, it is also possible to update and store the target template on the basis of the newestly obtained candidate target.

Here, refer to FIG. 3 again; in STEP S250, the expression part 160 expresses, by a probability density distribution of features, a candidate target whose position moves in the candidate target region. In the process of estimating the probability densities of features of the candidate target, each pixel is weighted based on both color space information and the depth weight information of this pixel.

As described above, it is possible to let a window, whose size is the same as the target template, move in the candidate target region, so as to obtain the candidate target. After that, by analyzing each pixel in the candidate target, it is possible to obtain the expression of the candidate target.

In what follow, an example of the expression of the candidate target (also called the "candidate target expression" or "candidate target description") will be given.

The candidate target expression is similar to the target template expression; that is to say, a probability density distribution of features of the candidate target is acquired on the basis of the same feature space.

Here it should be noted that the key point is that in the process of estimating the probability density of each feature of the candidate target, each pixel is weighted based on both color space information and the depth weight information of this pixel.

If it is assumed that the central position of the candidate target is y, then the candidate target may be expressed as p(y)=($p_1$(y), . . . , $p_u$(y), . . . $p_m$(y)).

Here the probability $p_u(y)$ of a feature value in the feature space of the candidate target may be calculated according to the following equation (9).

$$p_u(y) = C_p \sum_{i=1}^{N} \left( \delta[b(x_i) - u] * \left( k \left( \| \frac{x_i - y}{h} \|^2 \right) * v(i) \right) \right) \quad (9)$$

Here, as described above, y refers to the central position of the candidate target; u refers to the index of a feature value (u=1, . . . , m, and m refers to the total number of the feature values in the feature space); $p_u(y)$ refers to the probability of the $u^{th}$ feature value in the feature space of the candidate target; N refers to the total number of pixels of the candidate target; i refers to the index of a pixel of the candidate target; $x_i$ refers to the 2-dimensional coordinate of the $i^{th}$ pixel; h refers to a width with respect to the central point (i.e., the central position y); $C_p$ refers to a normalization coefficient; b(·) refers to an interval quantization function; δ refers to the Kronecker delta function; k(·) refers to a 2-dimensional space weight kernel function; and v(i) refers to a depth weight value of the $i^{th}$ pixel.

The depth weight value v(i) may be obtained in STEP S230 of FIG. 3 in advance. For example, it is possible to obtain that on the basis of the equations (5) and (6) above.

In this example, both the depth weight value and the 2-dimensional position of each pixel are adopted to perform weighting on this pixel in the process of calculating the probability of each feature in the corresponding feature space. As a result, it is possible to let the relevant depth information be naturally and closely combined into the whole object tracking process, so as to increase the rate of utilization of information and to improve the accuracy of tracking.

Here, refer to FIG. 3 again; in STEP S260, the calculation part 160 calculates, on the basis of the probability density expression of the target template and the probability density expression of the candidate target, the similarity between the target template and the candidate target, so as to obtain the confidence level image of the candidate target region.

In an example, it is possible to respectively regard the target template and the candidate target as two m-dimensional vectors; namely, the target template is q=($q_1$, . . . , $q_u$, . . . , $q_m$), and the candidate target is p(y)=($p_1$(y), . . . , $p_u$(y), . . . , $p_m$(y)). After that, the similarity of the two may be calculated on the basis of the Bhattacharyya coefficient of the two. In particular, it is possible to calculate, on the basis of the technique described in the above-mentioned paper entitled "Kernel-based Object Tracking", the similarity ρ(y) of the candidate target and the target template, according to the following equation (10).

$$\rho(y) \equiv \rho(p(y), q) = \sum_{u=1}^{m} \sqrt{p_u(y) q_u} \quad (10)$$

The above equation (10) has a physical meaning; namely, it may be regarded as the cosine of the angle generated by the two m-dimensional vectors, and may also be regarded as the correlation of the two m-dimensional vectors.

Hence, it is possible to calculate the similarity between the candidate target and the target template at the position y.

As a result, by moving a window, whose size is the same as that of the target template and which is used to select a candidate target, in the whole candidate target region, i.e., by changing the position y of the candidate target, it is possible to obtain the candidate target at each position y. After that, for each candidate target, the candidate target expression of this candidate target is acquired by the process of STEP S250, and then, the similarity between the target template and this candidate target is calculated. In this way, it is possible to get a confidence level image of the candidate target region, in which the confidence level of each position reflects the probability of this position belonging to the tracking object in the current frame.

Here, refer to FIG. 3 again; in STEP S270, the location part 170 locates, on the basis of the confidence level image of the candidate target region, the position of the tracking object in the current frame.

In what follows, an example of a process of locating the tracking object on the basis of the similarity function, i.e., the equation (10) will be given.

First, a start point, whose coordinates are set as ($x_0,y_0$), in the candidate target region of the current frame is determined. For example, it is possible to select the position at the top left corner or the central position of the candidate target region to serve as the start point. After that, on the basis of the Taylor's development, the equation (10) may be expressed as the following equation (11).

$$\rho(p(y), q) \approx \frac{1}{2} \sum_{u=1}^{m} \sqrt{p_u(y_0) q_u} + \frac{1}{2} \sum_{u=1}^{m} p_u(y) \sqrt{\frac{q_u}{p_u(y_0)}} \quad (11)$$

And then, on the basis of the equations (7) and (9) as well as the equation (11), it is possible to obtain the following equation (12).

$$\rho(p(y), q) \approx \frac{1}{2} \sum_{u=1}^{m} \sqrt{p_u(y_0) q_u} + \frac{C_h}{2} \sum_{i=1}^{N} w_i * \left( k \| \frac{y - x_i}{h} \|^2 \right) * v(i) \quad (12)$$

Here, $w_i$ may be calculated according to the following equation (13).

$$w_i = \sum_{u=1}^{m} \sqrt{\frac{q_u}{p_u(y_0)}} \delta[b(x_i) - u] \quad (13)$$

As a result, if it is necessary to maximize the similarity between the candidate target and the target template, then the second item in the equation (11) should be maximized.

Here, it is possible to adopt the mean shift algorithm to find the position in the candidate target region, at which the similarity of the candidate target and the target template is maximum, and then to let this position be the position of the tracking object in the current frame.

Therefore, by utilizing the object tracking method according to the first embodiment, in a process of estimating the probability densities of various features of a candidate target, for each pixel, it is possible to let this pixel be weighted on the basis of both the color space information of this pixel and the depth weight information of this pixel. As a result, compared to a conventional technique in which the depth information is independently considered or serves as a kind of threshold when performing filtering on a candidate target, it is possible to let the depth information be naturally and closely combined into the whole object tracking process, so as to increase the rate of utilization of information and to improve the accuracy of tracking.

Here it should be noted that the order of the steps shown in FIG. 3 is just an example. Actually, it is possible to conduct the steps shown in FIG. 3 according to another order. For example, STEP S230 may be conducted in STEP S250.

4. Second Embodiment of Object Tracking Method

In the first embodiment, a target template and a candidate target correspond to the whole tracking object. In this embodiment, the target template and the candidate target are respectively divided so as to obtain plural sub target templates and plural sub candidate targets; then, the similarities between the sub target templates and the corresponding sub candidate targets are calculated on the basis of the object tracking method according to the first embodiment; and then, the similarity between the whole target template and the whole candidate target is acquired on the basis of the similarities between the sub target templates and the corresponding sub candidate targets.

In an example, a target template is divided into plural sub target templates, and then, in the same way as the target template is divided, a candidate target is also divided into plural sub candidate targets.

Figure 5:
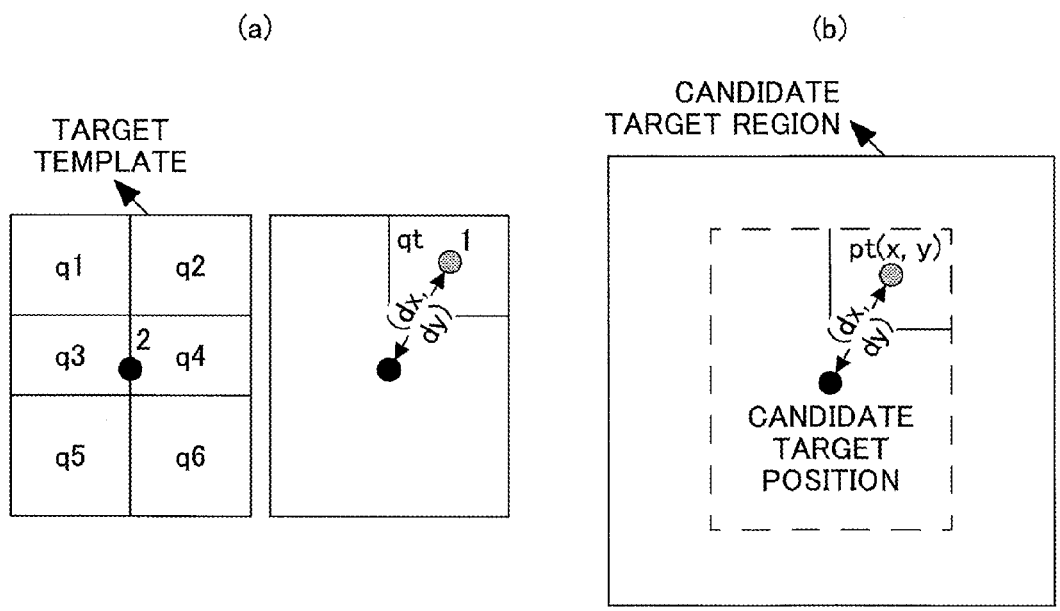
FIG. 5 includes images (a) and (b) for illustrating how to divide a candidate target in a candidate tracking region on the basis of a divided target template.

FIG. 5 includes images (a) and (b) for illustrating how to divide a candidate target in a candidate tracking region on the basis of a divided target template.

As shown in FIG. 5, the image (a) refers to a target template (also called a "tracking template") of a hand, which is divided into six sub target templates (also called "sub tracking templates"). The size of each sub target template is the same. Here it should be noted that this is just an example; in other words, the number of the sub target templates is not limited to six. In addition, in the image (a), 1 refers to the central point of each sub target template, 2 refers to the central point of the target template, and (dx,dy) refers to the distance between the central point of each sub target template and the central point of the target template. As a result, on the basis of the distance (dx,dy), it is possible to divide a candidate target, i.e., the portion surrounded by the dotted line in the image (b) in the same way as the target template in the image (a) is divided, so as to get plural sub candidate targets corresponding to the sub target templates in the image (a).

In an example, regarding each sub target template and its corresponding sub candidate target, each of them may be respectively expressed by the probability of each feature value, as done in the first embodiment; namely, the probability of each feature is estimated by calculating the number of pixels corresponding to this feature value in the related region. In addition, in the process of estimating the probability of each feature of the corresponding sub candidate target, each pixel is weighted on the basis of both the color feature information and the depth weight information.

For example, in this case, the probability density of a feature of a sub target template t may be calculated according to the following equation (14).

$$q_u^t = C_q^t \sum_{i=1}^{N^t} \left\{ \delta[b(x_i^t) - u] * k\left( \| \frac{x_i^t - x_0^t}{h^t} \|^2 \right) * v(i^t) \right\} \tag{14}$$

Here, t refers to the index of a sub target template; $x_0^t$ refers to the central position of the sub target template t; u refers to the index of a feature value (u=1, ..., m, and m refers to the total number of the feature values in the feature space); $q_u^t$ refers to the probability of the $u^{th}$ feature value in the feature space of the sub target template t; $N^t$ refers to the total number of pixels in the sub target template t; i refers to the index of a pixel in the sub target template t; $x_i^t$ refers to a 2-dimensional coordinate of the $i^{th}$ pixel in the sub target template i; $h^t$ refers to a width with respect to the central point (i.e., the central position $x_0^t$); $C_q^t$ refers to a normalization coefficient; b(·) refers to an interval quantization function; δ refers to the Kronecker delta function; v($i^t$) refers to a depth weight value of the $i^{th}$ pixel in the sub target template t; and k(·) refers to a 2-dimensional space weight kernel function.

Furthermore, the probability density of a feature value of the corresponding sub candidate target t may be calculated according to the following equation (15).

$$p_u^t(y^t) = C_p^t \sum_{i=1}^{N^t} \left( \delta[b(x_i^t) - u] * \left( k\left( \| \frac{x_i^t - y^t}{h^t} \|^2 \right) * v(i^t) \right) \right) \tag{15}$$

Here, t refers to the index of a sub candidate target; $y^t$ refers to the central position of the sub candidate target t; u refers to the index of a feature value (u=1, ..., m, and m refers to the total number of the feature values in the feature space); $p_u^t(y^t)$ refers to the probability of the $u^{th}$ feature value in the feature space of the sub candidate target t; $N^t$ refers to the total number of pixels of the sub candidate target t; i refers to the index of a pixel of the sub candidate target t; $x_i^t$ refers to a 2-dimensional coordinate of the $i^{th}$ pixel in the sub candidate target t; $h^t$ refers to a width with respect to the central point (i.e., the central position $y^t$); $C_p^t$ refers to a normalization coefficient; b(·) refers to an interval quantization function; δ refers to the Kronecker delta function; v($i^t$) refers to a depth weight value of the $i^{th}$ pixel of the sub candidate target; and k(·) refers to a 2-dimensional space weight kernel function.

After that, on the basis of the probability density expressions of the sub target template $q_u^t$ and the corresponding sub candidate target $p_u^t(y^t)$, the similarity $\rho^t$ between the two is calculated, as done in the first embodiment.

And then, on the basis of the similarity between each sub target template and the corresponding sub candidate target, the similarity ρ(y) between the whole target template and the whole candidate target is calculated.

In an example, the similarity ρ(y) between the whole target template and the whole candidate target may be calculated according to the following equation (16).

$$\rho(y) = \sum_{t=1}^{S} \lambda^t \rho^t = \lambda^1 \rho^1 + \lambda^2 \rho^2 + \cdots + \lambda^S \rho^S \tag{16}$$

Here, t refers to the index of a sub target template and its corresponding sub candidate target, respectively; S refers to the number of the sub target templates and the number of the sub candidate targets, respectively; λ refers to a weight value, and in an instance, $$\sum_{t=1}^{S} \lambda^t = 1$$

(however, this is not a must); and $\rho^t$ refers to the similarity between the sub target template $q_u^t$ and the corresponding sub candidate target $p_u^t(y^t)$.

Similar to the first embodiment, it is possible to move a window in the candidate target region so as to change the position of the candidate target, so that the candidate target at each position may be obtained. After that, for each candidate target, it is possible to acquire plural sub candidate targets of this candidate target, to acquire probability density expression of the each sub candidate target, and to calculate the similarity between each sub candidate target and the corresponding sub target template, so that the similarity between this candidate target and the corresponding target template may be obtained. In this way, it is possible to get the confidence level image of the candidate target region, where the confidence level of each pixel in the foreground region (the tracking object) is relatively large, and the confidence level of each pixel point in the background region is relatively small. As a result, by seeking a pixel point, whose probability is maximum, in the confidence level image, it is possible to acquire the position of the tracking object in the current frame.

Figure 6:
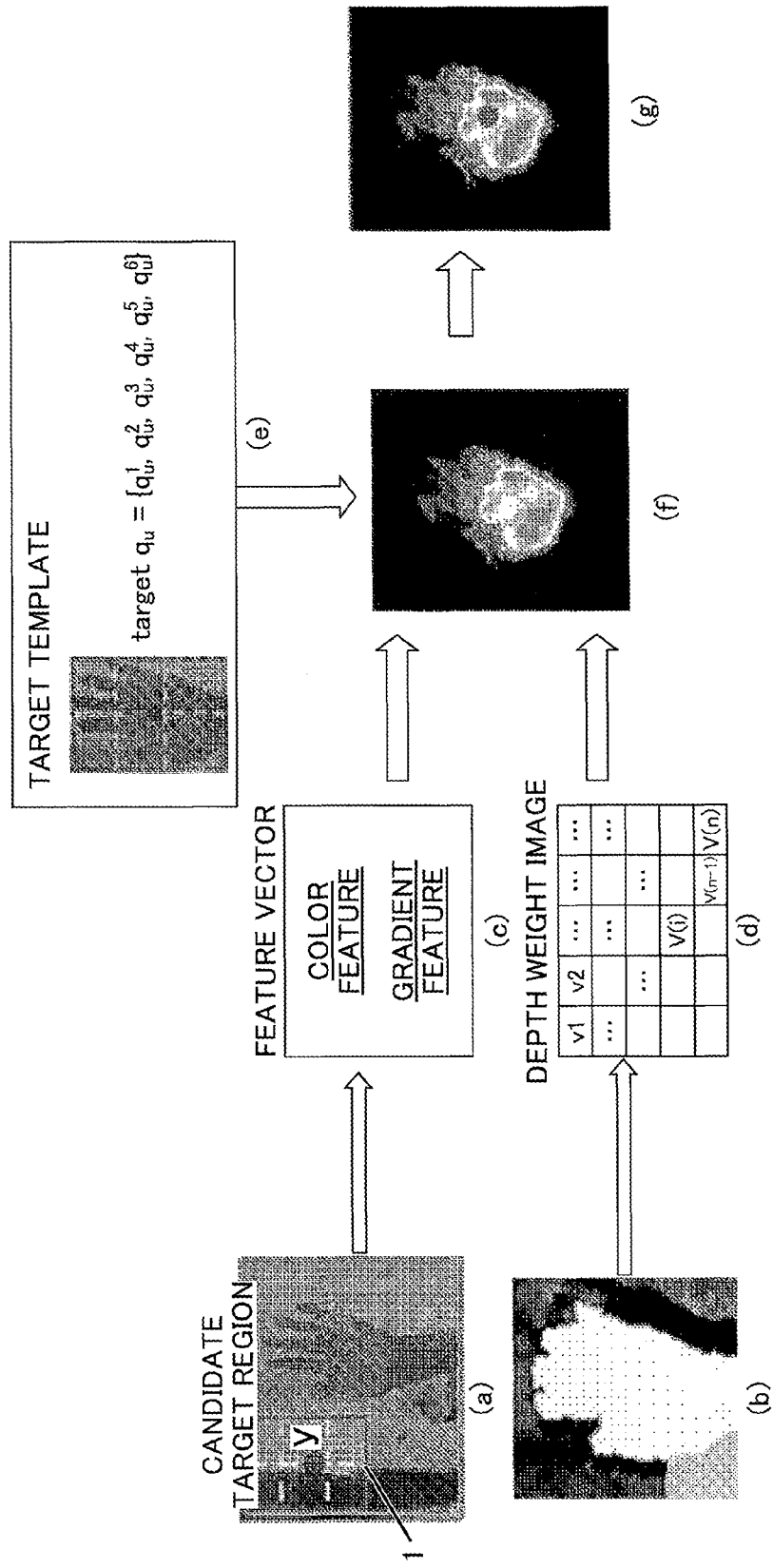
FIG. 6 includes images (a) to (g) for illustrating an object tracking method on the basis of division and depth weights.

FIG. 6 includes images (a) to (g) for illustrating an object tracking method on the basis of division and depth weights.

As shown in FIG. 6, the image (a) is the grayscale image of a candidate target region, where 1 refers to a candidate target, and the dotted line refers to the division of the candidate target; the image (b) is the depth image of the candidate target region; the image (c) refers to features obtained from the grayscale image, including color features and gradient features; the image (d) is the depth weigh image of the candidate target region; the image (e) shows the grayscale image of a target template, the division of the target template, and the target template expression obtained on the basis of each sub target template expression; the image (f) is the confidence level image of the candidate target region; and the image (g) shows the located position of a hand in the candidate target region.

By utilizing the object tracking method according to the second embodiment, it is possible to divide a target template and its corresponding candidate target, and to let the weights of the respective sub candidate targets be different. In an example, if it is known, according the historical information, that the similarity between an immediately prior sub candidate target and its corresponding sub target template is relatively small, then it is possible to give a relative small weight to the corresponding sub candidate target in the current frame. In this way, for example, in a case where a sub candidate target is shielded, since the similarity between the sub candidate target and its corresponding sub target template is relatively small, this sub candidate target may be given a relatively small weight; as a result, it is possible to reduce the influence of this sub candidate target on the similarity between the whole candidate target and its corresponding target template. In addition, in the process of calculating the probability of a sub candidate target, the depth weight information of each pixel may be considered. In this way, for example, in a case where the difference between the depth of a sub candidate target and the predicted depth of a hand is relatively large, each pixel in this sub candidate target may be given a relative small depth weight so that the evaluated probability of this sub candidate target belonging to the hand is relatively small; as a result, it is possible to reduce the influence of a local shielding on the hand tracking. Therefore, by utilizing the object tracking method on the basis of division and depth weights, even if the colors of a tracking object and its surrounding background are very similar and there is a local shielding, it is still possible to accurately locate the tracking object.

5. Third Embodiment of Object Tracking Method

In this embodiment, an object tracking method further includes a target template update step (also called an "update step").

In an example, in a case where a target template and a candidate target are not divided, the target template may be updated according to the following equation (17), only if a predetermined update condition is satisfied.

$$q_f = (1-\alpha)*q_{f-1} + \alpha*p_{cur} \qquad (17)$$

Here, $q_f$ refers to an updated target template; $q_{f-1}$ refers to a target template obtained after an immediately prior frame (i.e., a target template used when finding a tracking object in a current frame); $p_{cur}$ refers to the probability density expression of a located candidate target in the current frame; $\alpha$ refers to an adjustment coefficient, and $1 \geq \alpha \geq 0$. In an instance, if the similarity between the target template and its corresponding candidate target is less than a predetermined threshold, then the target template is not updated, i.e., $\alpha=0$. In another instance, the larger the similarity between the target template and its corresponding candidate target is, the larger $\alpha$ is.

In an example, in a case where a target template and a candidate target are divided, updating the target template includes updating each sub target template. Each sub target template may be updated according to the following equation (18), only if a predetermined update condition is satisfied by the located corresponding sub candidate target of this sub target template.

$$q_f^k = (1-\alpha)*q_{f-1}^k + \alpha*p_{cur}^k \qquad (18)$$

Here $q_f^k$ refers to an updated sub target template k; $q_{f-1}^k$ refers to a sub target template obtained after an immediately prior frame (i.e., a sub target template used when finding a tracking object in a current frame); $p_{cur}^k$ refers to the probability density expression of a located sub candidate target in the current frame; $\alpha$ refers to an adjustment coefficient, and $1 \geq \alpha \geq 0$. In an instance, if the similarity between the sub target template and its corresponding sub candidate target is less than a predetermined threshold (for example, 0.5), then the sub target template is not updated, i.e., $\alpha=0$. In another instance, the larger the similarity between the sub target template and its corresponding sub candidate target is, the larger $\alpha$ is.

In this example, the update of the target template is not carried out on the basis of the whole target template, but is carried out on the basis of each sub target template. And the update of each sub target template may be carried out independently.

Figure 7:
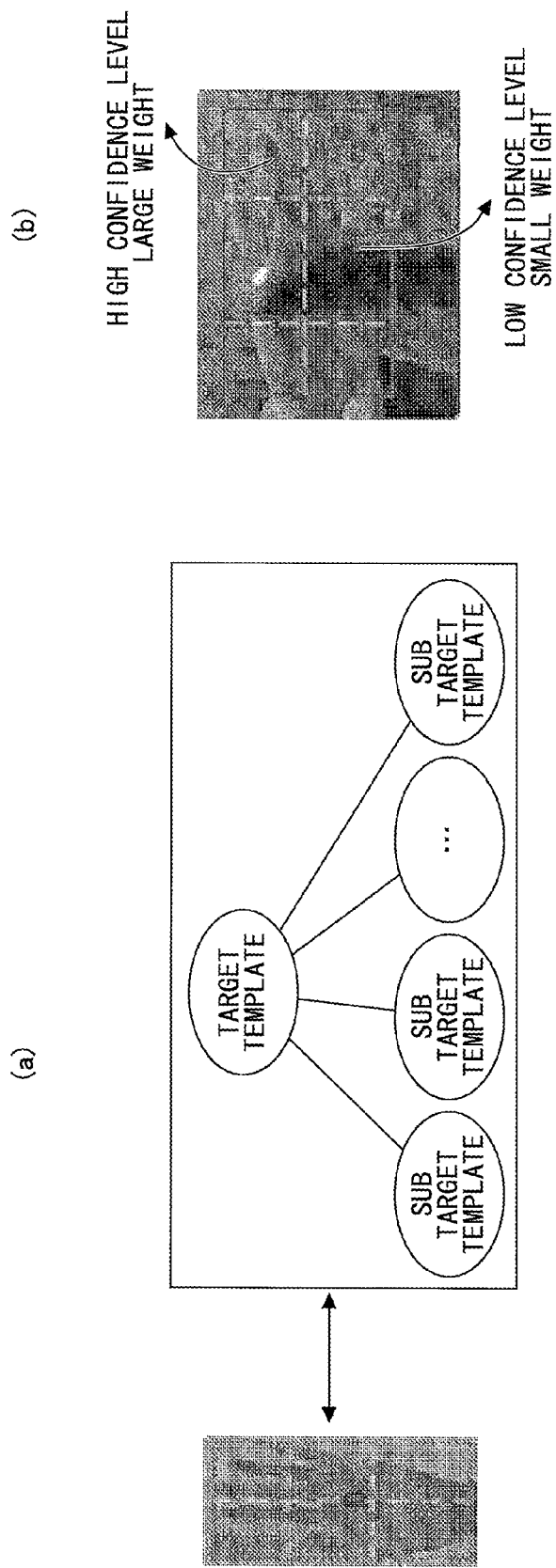
FIG. 7 includes images (a) and (b), wherein, the image (a) illustrates the division of a target template as well as the relationship between the target template and its sub target templates, and the image (b) illustrates the independent update of each sub template.

FIG. 7 includes images (a) and (b), wherein, the image (a) illustrates the division of a target template as well as the relationship between the target template and its sub target templates, and the image (b) illustrates the independent update of each sub template.

As shown in the image (b) of FIG. 7, since a candidate target corresponding to the target template is partially shielded, the similarity between the shielded part and its corresponding sub target template is relative small, i.e., is less than a predetermine threshold; as a result, the corresponding sub target template is not updated. In this way, the noise generated by a shielding object cannot be introduced into the target template so that the phenomenon of tracking shift can be effectively prevented.

In an example, the weight coefficient λ corresponding to each sub target template also needs to be updated. At the time point t+1 (i.e., the time point immediately after the current time t), the weight coefficient λ of the $k^{th}$ sub target template may be calculated according to the following equation (19).

$$\lambda^k_{t+1} = (1-\beta)\lambda^k_t + \beta * \rho(p^k_t(y), q^k) \quad (19)$$

Here ρ refers to the similarity between the $k^{th}$ sub target template and its corresponding sub candidate target, and β refers to an adjustment coefficient. In this way, it is possible to adjust, on the basis of the similarity of a sub target template and its corresponding sub candidate target at the current time, the weight coefficient of this sub target template for the next time use.

In a normal case, if a tracking object is partially shielded, then the shielded part may bring negative influence to the object tracking. However, by utilizing the object tracking method on the basis of division and weighting, according to the embodiments of the present invention, it is possible to effectively avoid this kind of negative influence. In a case where a tracking object is partially shielded, the confidence level of the shielded part is relatively low. As a result, for example, as shown in the image (b) of FIG. 7, the weight corresponding to the shielded part may be decreased. In this way, the influence of the tracking result of the shielded part on the whole tracking result may be reduced. On the other hand, after the tracking object has passed the shielding object, the weight corresponding to the shielded part may be increased again. Therefore, in the object tracking process, even if the tracking object is partially shielded, it is still possible to accurately find the tracking object, i.e., the tracking result cannot be influenced.

It is thus apparent that if the similarity of a sub candidate target and its corresponding sub target template is relatively small, then the corresponding sub target template is not updated, and at the same time, the weight of the corresponding sub target template is decreased. In this way, it is possible to effectively reduce the influence of a partial shielding on the object tracking.

6. Example Computer System for Object Tracking

Figure 8:
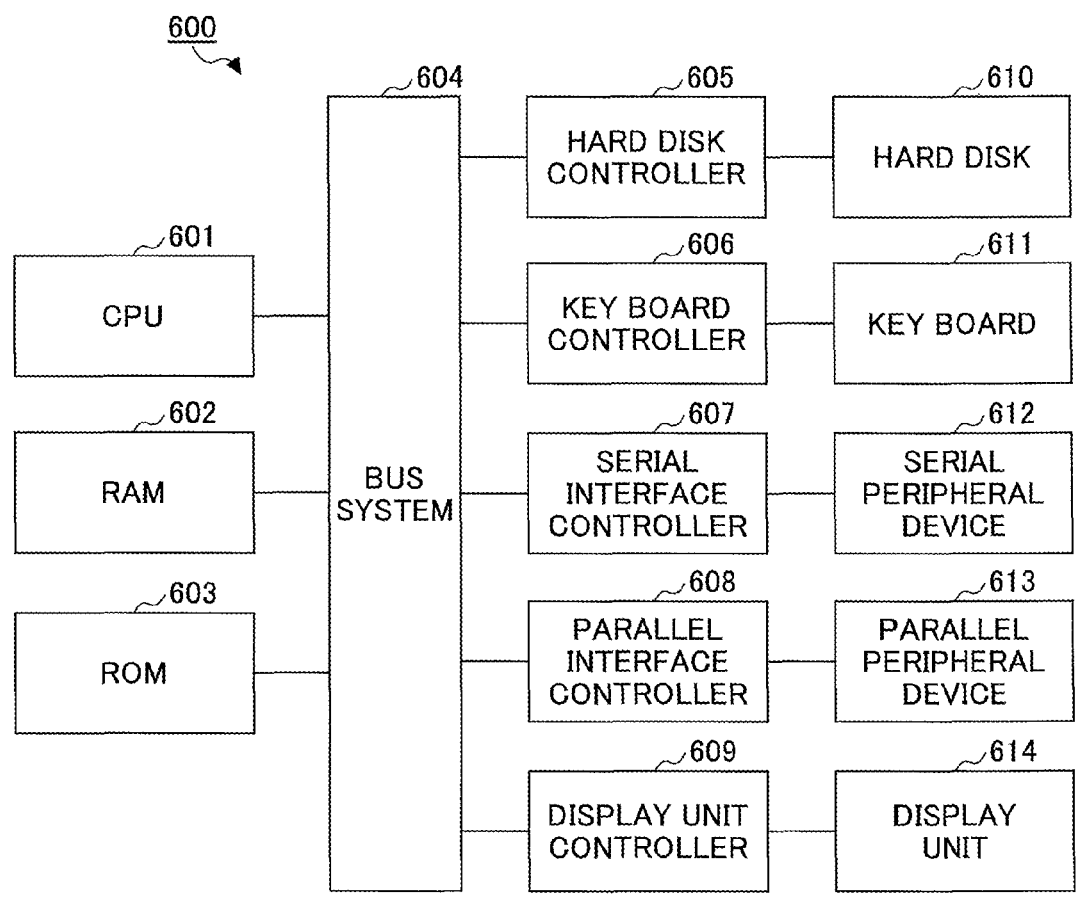
FIG. 8 illustrates a block diagram of an exemplary computer system 600 suitable for achieving the embodiments of the present invention.

FIG. 8 illustrates a block diagram of an exemplary computer system 600 suitable for achieving the embodiments of the present invention.

As shown in FIG. 8, the computer system 600 may include a central processing unit (CPU) 601, a random access memory (RAM) 602, a read-only memory (ROM) 603, a bus 604, a hard disk controller 605, a keyboard controller 606, a serial interface controller 607, a parallel interface controller 608, a display unit controller 609, a hard disk 610, a keyboard 611, a serial peripheral device 612, a parallel peripheral device 613, and a display unit 614. The CPU 601, the RAM 602, the ROM 603, the hard disk controller 605, the keyboard controller 606, the serial interface controller 607, the parallel interface controller 608, and the display unit controller 609 are coupled with the bus 604. The hard disk 610 is coupled with the hard disk controller 605. The keyboard 611 is coupled with the keyboard controller 606. The serial peripheral device 612 is coupled with the serial interface controller 607. The parallel peripheral device 613 is coupled with the parallel interface controller 608. The display unit 614 is coupled with the display unit controller 609. It should be noted that the computer system shown in FIG. 8 is just an example, and is not used to restrict the present invention. In some cases, it is also possible to increase or decrease some components.

In addition, it should be noted that the above respective embodiments are just exemplary ones, and the specific structure and operation of each of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Patent Application No. 201410025887.X filed on Jan. 20, 2014, the entire contents of which are hereby incorporated by reference.

What is claimed is:

1. An object tracking method comprising:
   an obtention step of obtaining a grayscale image sequence and its corresponding depth image sequence;
   a prediction step of predicting a candidate target region of a tracking object in at least one of a current grayscale image and it corresponding depth image;
   a determination step of determining a depth weight image of the candidate target region, wherein, the depth weight image includes depth weight information of each pixel, and the depth weight information of each pixel refers to depth information based on this pixel and a probability of this pixel belonging to the tracking object;

an acquirement step of acquiring a target template, wherein, the target template is expressed by a probability density distribution of features;

an expression step of expressing, by a probability density distribution of features, a candidate target whose position moves in the candidate target region, wherein, in a process of estimating probability densities of features of the candidate target, each pixel is weighted based on both color space information and the depth weight information of this pixel;

a calculation step of calculating, based on a probability density expression of the target template and a probability density expression of the candidate target, a similarity between the target template and the candidate target, so as to get a confidence level image of the candidate target region; and a location step of locating, based on the confidence level image of the candidate target region, a position of the tracking object in the corresponding current image.

2. The object tracking method according to claim 1, wherein, a probability of a feature value in a feature space of the candidate target is calculated by $$p_u(y) = C_p \sum_{i=1}^{N} \left( \delta[b(x_i) - u] * \left( k \left( \| \frac{x_i - y}{h} \|^2 \right) * v(i) \right) \right),$$

wherein, y refers to a central position of the candidate target; u refers to an index of a feature value, u=1, ..., m, and m refers to a total number of feature values in the feature space of the candidate target; $p_u(y)$ refers to a probability of the $u^{th}$ feature value in the feature space of the candidate target; N refers to a total number of pixels of the candidate target; i refers to an index of a pixel of the candidate target; $x_i$ refers to a 2-dimensional coordinate of the $i^{th}$ pixel; h refers to a width with respect to the central position y; $C_p$ refers to a normalization coefficient; b(·) refers to an interval quantization function; δ refers to the Kronecker delta function; k(·) refers to a kernel function; and v(i) refers to a depth weight value of the $i^{th}$ pixel.

3. The object tracking method according to claim 1, wherein, the target template is divided into plural sub target templates, and the candidate target is also divided into plural sub candidate targets in a same way as the target template is divided, wherein, for each of the plural sub target templates and its corresponding sub candidate target, this sub target template and its corresponding sub candidate target are expressed by a probability of each feature value, respectively, wherein, the probability of each feature value is estimated by calculating a number of pixels corresponding to this feature value, in regions related to this sub target template and its corresponding sub candidate target, respectively, and in a process of estimating the probability of each feature value of the corresponding sub candidate target, each pixel in the region related to the corresponding sub candidate target is weighted based on both color space information of this pixel and the depth weight information of this pixel; and a similarity between this sub target template and its corresponding sub candidate target is calculated based on probability density expressions of this sub target template and its corresponding sub candidate target, and the similarity between the target template and the candidate target is calculated based on the similarity between each sub target template and its corresponding sub candidate target.

4. The object tracking method according to claim 3, wherein, a probability of a feature value in a feature space of the corresponding sub candidate target is calculated by $$p_u^t(y^t) = C_p^t \sum_{i=1}^{N^t} \left( \delta[b(x_i^t) - u] * \left( k \left( \| \frac{x_i^t - y^t}{h^t} \|^2 \right) * v(i^t) \right) \right),$$

wherein, t refers to an index of a sub candidate target; $y^t$ refers to a central position of the sub candidate target t; u refers to an index of a feature value, u=1, ..., m, and m refers to a total number of feature values in a feature space of the sub candidate target t; $p_u^t(y^t)$ refers to a probability of the $u^{th}$ feature value in the feature space of the sub candidate target t; $N^t$ refers to a total number of pixels of the sub candidate target t; i refers to an index of a pixel of the sub candidate target t; $x_i^t$ refers to a 2-dimensional coordinate of the $i^{th}$ pixel of the sub candidate target t; $h^t$ refers to a width with respect to the central position $y^t$; $C_p^t$ refers to a normalization coefficient; b(·) refers to an interval quantization function; δ refers to the Kronecker delta function; $v(i^t)$ refers to a depth weight value of the $i^{th}$ pixel of the sub candidate target; and k(·) refers to a kernel function.

5. The object tracking method according to claim 1, wherein, the determination step includes:

predicting a representative depth value $depth_{value}$ of the tracking object in the corresponding current image; and calculating a probability of a pixel in the candidate target region, belonging to the tracking object based on $$v(i) = \frac{\min(depth_{object}, depth(i))}{\max(depth_{object}, depth(i))},$$

wherein, i refers to an index of a pixel in the candidate target region; depth(i) refers to a depth value of the pixel i or a smoothed depth value of a local area including the pixel i; $\min(depth_{object}, depth(i))$ refers to a smaller one of $depth_{object}$ and depth (i); max ($depth_{object}$, depth (i)) refers to a larger one of $depth_{object}$ and depth(i).

6. The object tracking method according to claim 1, wherein, the determination step includes:

predicting a representative depth value $depth_{value}$ of the tracking object in the corresponding current image; and calculating a probability of a pixel in the candidate target region, belonging to the tracking object based on $$v(i) = k \left( \| \frac{depth(i) - depth_{object}}{h^{depth}} \|^2 \right),$$

where i refers to an index of a pixel in the candidate target region; depth(i) refers to a depth value of the pixel i or a smoothed depth value of a local area including the pixel i; $h^{depth}$ refers to a width with respect to a central point $depth_{object}$; and $k(\cdot)$ refers to a kernel function.

7. The object tracking method according to claim 3, wherein:
when the similarity between the target template and the candidate target is calculated based on the similarity between each sub target template and its corresponding sub candidate target, each sub target template has a weight coefficient; and
based on the similarity between each sub target template and its corresponding sub candidate target, the weight coefficient of this sub target template is updated.

8. The object tracking method according to claim 1, wherein, the features used for expressing the target template and the candidate object include:
a color feature component in a grayscale image, a gradient feature component in the grayscale image, and a gradient feature component in a corresponding depth image.

9. The object tracking method according to claim 3, after the location step, further comprising:
an update step of independently updating each sub target template, wherein, only if the corresponding sub candidate target of this sub target template satisfies a predetermined update condition, this sub target template is updated by utilizing the corresponding sub candidate target.

10. An object tracking device comprising:
an obtention part configured to obtain a grayscale image sequence and its corresponding depth image sequence;
a prediction part configured to predict a candidate target region of a tracking object in at least one of a current grayscale image and it corresponding depth image;
a determination part configured to determine a depth weight image of the candidate target region, wherein, the depth weight image includes depth weight information of each pixel, and the depth weight information of each pixel refers to depth information based on this pixel and a probability of this pixel belonging to the tracking object;
an acquirement part configured to acquire a target template, wherein, the target template is expressed by a probability density distribution of features;
an expression part configured to express, by a probability density distribution of features, a candidate target whose position moves in the candidate target region, wherein, in a process of estimating probability densities of features of the candidate target, each pixel is weighted based on both color space information and the depth weight information of this pixel;
a calculation part configured to calculate, based on a probability density expression of the target template and a probability density expression of the candidate target, a similarity between the target template and the candidate target, so as to get a confidence level image of the candidate target region; and
a location part configured to locate, based on the confidence level image of the candidate target region, a position of the tracking object in the corresponding current image.

11. The object tracking device according to claim 10, wherein, a probability of a feature value in a feature space of the candidate target is calculated by $$p_u(y) = C_p \sum_{i=1}^{N} \left( \delta[b(x_i) - u] * \left( k \left( \| \frac{x_i - y}{h} \|^2 \right) * v(i) \right) \right),$$

wherein, y refers to a central position of the candidate target; u refers to an index of a feature value, u=1 ..., m, and m refers to a total number of feature values in the feature space of the candidate target; $p_u(y)$ refers to a probability of the $u^{th}$ feature value in the feature space of the candidate target; N refers to a total number of pixels of the candidate target; i refers to an index of a pixel of the candidate target; $x_i$ refers to a 2-dimensional coordinate of the $i^{th}$ pixel; h refers to a width with respect to the central position y; $C_p$ refers to a normalization coefficient; $b(\cdot)$ refers to an interval quantization function; $\delta$ refers to the Kronecker delta function; $k(\cdot)$ refers to a kernel function; and v(i) refers to a depth weight value of the $i^{th}$ pixel.

12. The object tracking device according to claim 10, wherein, the target template is divided into plural sub target templates, and the candidate target is also divided into plural sub candidate targets in a same way as the target template is divided,
wherein, for each of the plural sub target templates and its corresponding sub candidate target,
this sub target template and its corresponding sub candidate target are expressed by a probability of each feature value, respectively, wherein, the probability of each feature value is estimated by calculating a number of pixels corresponding to this feature value, in regions related to this sub target template and its corresponding sub candidate target, respectively, and in a process of estimating the probability of each feature value of the corresponding sub candidate target, each pixel in the region related to the corresponding sub candidate target is weighted based on both color space information of this pixel and the depth weight information of this pixel; and
a similarity between this sub target template and its corresponding sub candidate target is calculated based on probability density expressions of this sub target template and its corresponding sub candidate target, and
the similarity between the target template and the candidate target is calculated based on the similarity between each sub target template and its corresponding sub candidate target.

13. The object tracking device according to claim 12, wherein, a probability of a feature value in a feature space of the corresponding sub candidate target is calculated by $$p_u^t(y^t) = C_p^t \sum_{i=1}^{N^t} \left( \delta[b(x_i^t) - u] * \left( k \left( \| \frac{x_i^t - y^t}{h^t} \|^2 \right) * v(i^t) \right) \right),$$

wherein, t refers to an index of a sub candidate target; $y^t$ refers to a central position of the sub candidate target t; u refers to an index of a feature value, u=1, ..., m, and m refers to a total number of feature values in a feature space of the sub candidate target t; $p_u^t(y^t)$ refers to a probability of the $u^{th}$ feature value in the feature space of the sub candidate target t; $N^t$ refers to a total number of pixels of the sub candidate target t; i refers to an index of a pixel of the sub candidate target t; $x_i^t$ refers to a 2-dimensional coordinate of the $i^{th}$ pixel of the sub candidate target t; $h^t$ refers to a width with respect to the central position $y^t$; $C_p^t$ refers to a normalization coefficient; $b(\cdot)$ refers to an interval quantization function; $\delta$ refers to the Kronecker delta function; $v(i^t)$ refers to a depth weight value of the $i^{th}$ pixel of the sub candidate target; and $k(\cdot)$ refers to a kernel function.

14. The object tracking device according to claim 10, wherein, the determination part conducts:

predicting a representative depth value $depth_{value}$ of the tracking object in the corresponding current frame; and calculating a probability of a pixel in the candidate target region, belonging to the tracking object based on $$v(i) = \frac{\min(depth_{object}, depth(i))}{\max(depth_{object}, depth(i))},$$

wherein, i refers to an index of a pixel in the candidate target region; depth(i) refers to a depth value of the pixel i or a smoothed depth value of a local area including the pixel i; $\min(depth_{object}, depth(i))$ refers to a smaller one of $depth_{object}$ and depth (i); max $(depth_{object}, depth(i))$ refers to a larger one of $depth_{object}$ and depth(i).

15. The object tracking device according to claim 10, wherein, the determination part conducts:

predicting a representative depth value $depth_{value}$ of the tracking object in the corresponding current frame; and calculating a probability of a pixel in the candidate target region, belonging to the tracking object based on $$v(i) = k\left(\left\|\frac{depth(i) - depth_{object}}{h^{depth}}\right\|^2\right),$$

where i refers to an index of a pixel in the candidate target region; depth(i) refers to a depth value of the pixel i or a smoothed depth value of a local area including the pixel i; $h^{depth}$ refers to a width with respect to a central point $depth_{object}$; and $k(\cdot)$ refers to a kernel function.

16. The object tracking device according to claim 12, wherein:

when the similarity between the target template and the candidate target is calculated based on the similarity between each sub target template and its corresponding sub candidate target, each sub target template has a weight coefficient; and based on the similarity between each sub target template and its corresponding sub candidate target, the weight coefficient of this sub target template is updated.

17. The object tracking device according to claim 10, wherein, the features used for expressing the target template and the candidate object include:

a color feature component in a grayscale image, a gradient feature component in the grayscale image, and a gradient feature component in a corresponding depth image.

18. The object tracking device according to claim 12, further comprising:

an update part configured to, after the location part located the position of the tracking object in the corresponding current image, independently update each sub target template, wherein, only if the corresponding sub candidate target of this sub target template satisfies a predetermined update condition, this sub target template is updated by utilizing the corresponding sub candidate target.

* * * * *